(12) United States Patent
Oh et al.

(10) Patent No.: US 10,176,333 B2
(45) Date of Patent: Jan. 8, 2019

(54) TOKEN-BASED SCHEME FOR GRANTING PERMISSIONS

(71) Applicant: Samsung Electronics Co., Ltd., Gyeonggi-do (KR)

(72) Inventors: Myeong Jin Oh, Seoul (KR); Ju Ha Park, Gyeonggi-do (KR); Michael Pak, Seoul (KR); Sung Kyu Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 18 days.

(21) Appl. No.: 14/858,146

(22) Filed: Sep. 18, 2015

(65) Prior Publication Data

US 2016/0085977 A1 Mar. 24, 2016

(30) Foreign Application Priority Data

Sep. 18, 2014 (KR) .................. 10-2014-0124512

(51) Int. Cl.

| | | |
|---|---|---|
| *G06F 21/62* | (2013.01) | |
| *G06F 21/44* | (2013.01) | |
| *G06F 21/51* | (2013.01) | |
| *G06F 8/61* | (2018.01) | |
| *G06F 17/30* | (2006.01) | |

(52) U.S. Cl.
CPC .............. *G06F 21/62* (2013.01); *G06F 8/61* (2013.01); *G06F 17/30424* (2013.01); *G06F 21/44* (2013.01); *G06F 21/51* (2013.01); *G06F 2221/2141* (2013.01)

(58) Field of Classification Search
CPC .. G06F 21/51; G06F 2221/2141; G06F 21/44; G06F 8/61
See application file for complete search history.

(56) References Cited

U.S. PATENT DOCUMENTS

| | | | |
|---|---|---|---|
| 6,981,281 B1 * | 12/2005 | LaMacchia ............ | G06F 21/52 713/190 |
| 7,970,381 B2 | 6/2011 | Chesnutt et al. | |
| 8,122,263 B2 | 2/2012 | Leichsenring et al. | |
| 8,195,129 B2 | 6/2012 | Chesnutt et al. | |
| 8,204,519 B2 | 6/2012 | Richardson et al. | |
| 8,214,639 B2 | 7/2012 | Leichsenring et al. | |

(Continued)

FOREIGN PATENT DOCUMENTS

| | | |
|---|---|---|
| CN | 101853353 A | 10/2010 |
| EP | 1 818 833 A1 | 8/2007 |

(Continued)

OTHER PUBLICATIONS

European Search Report dated Dec. 7, 2016.
Chinese Search Report dated Nov. 24, 2017.
European Search Report dated Mar. 3, 2018.

*Primary Examiner* — James R Turchen
(74) *Attorney, Agent, or Firm* — Cha & Reiter, LLC.

(57) ABSTRACT

An electronic device comprising: a memory; and at least one processor configured to: install an application by using an installation file associated with the application; grant at least one permission to the application based on a permission setting token that is included in the installation file; and store, in a database, an indication that the application is granted the permission.

13 Claims, 9 Drawing Sheets

(56) References Cited

U.S. PATENT DOCUMENTS

| | | | | |
|---|---|---|---|---|
| 8,255,991 | B1* | 8/2012 | Hackborn | G06F 8/61 |
| | | | | 726/21 |
| 8,387,141 | B1* | 2/2013 | Zhukov | H04L 51/12 |
| | | | | 726/22 |
| 8,484,728 | B2* | 7/2013 | De Atley | G06F 21/51 |
| | | | | 711/154 |
| 8,595,489 | B1* | 11/2013 | Faaborg | H04W 12/02 |
| | | | | 713/166 |
| 8,656,465 | B1* | 2/2014 | Fong-Jones | G06F 21/6281 |
| | | | | 713/165 |
| 8,719,566 | B2 | 5/2014 | Leichsenring et al. | |
| 8,732,827 | B1 | 5/2014 | Zhukov et al. | |
| 8,819,827 | B1* | 8/2014 | Easttom | G06F 21/565 |
| | | | | 713/150 |
| 8,954,101 | B2 | 2/2015 | Richardson et al. | |
| 8,990,561 | B2* | 3/2015 | Sheehan | G06F 9/468 |
| | | | | 713/167 |
| 9,075,966 | B2* | 7/2015 | Wheeler | G06F 21/51 |
| 9,112,854 | B1* | 8/2015 | Bhimanaik | H04L 63/126 |
| 9,245,128 | B2* | 1/2016 | Karaa | G06F 8/61 |
| 9,336,358 | B2* | 5/2016 | Ramachandran | G06F 21/51 |
| 9,369,433 | B1* | 6/2016 | Paul | H04L 63/0227 |
| 9,372,681 | B1* | 6/2016 | Shevchenko | G06F 8/61 |
| 9,489,524 | B2* | 11/2016 | Wurster | G06F 21/62 |
| 2003/0079136 | A1* | 4/2003 | Ericta | H04L 63/101 |
| | | | | 713/185 |
| 2004/0122877 | A1* | 6/2004 | Nakayama | H04L 63/0807 |
| | | | | 708/200 |
| 2004/0139206 | A1* | 7/2004 | Claudatos | H04L 41/0893 |
| | | | | 709/229 |
| 2004/0148514 | A1* | 7/2004 | Fee | G06F 21/51 |
| | | | | 726/22 |
| 2005/0034116 | A1* | 2/2005 | Rodriguez | G06F 21/10 |
| | | | | 717/174 |
| 2006/0101408 | A1* | 5/2006 | Kotamarthi | G06F 21/6281 |
| | | | | 717/126 |
| 2006/0160626 | A1 | 7/2006 | Gatto et al. | |
| 2007/0005758 | A1* | 1/2007 | Hughes, Jr. | G06F 21/51 |
| | | | | 709/224 |
| 2007/0016953 | A1* | 1/2007 | Morris | G06F 21/56 |
| | | | | 726/24 |
| 2007/0087765 | A1 | 4/2007 | Richardson et al. | |
| 2009/0047929 | A1 | 2/2009 | Chesnutt et al. | |
| 2009/0048691 | A1* | 2/2009 | Donaldson | G06F 21/10 |
| | | | | 700/90 |
| 2009/0210702 | A1* | 8/2009 | Welingkar | H04L 9/321 |
| | | | | 713/156 |
| 2009/0222674 | A1 | 9/2009 | Leichsenring et al. | |
| 2010/0049992 | A1 | 2/2010 | Leichsenring et al. | |
| 2010/0304872 | A1 | 12/2010 | Gatto et al. | |
| 2011/0137991 | A1* | 6/2011 | Russell | G06Q 10/06 |
| | | | | 709/204 |
| 2011/0138460 | A1* | 6/2011 | Wheeler | G06F 21/51 |
| | | | | 726/21 |
| 2011/0167474 | A1* | 7/2011 | Sinha | G06F 21/51 |
| | | | | 726/1 |
| 2011/0244830 | A1 | 10/2011 | Chesnutt et al. | |
| 2012/0030354 | A1* | 2/2012 | Razzaq | G06F 21/335 |
| | | | | 709/225 |
| 2012/0072968 | A1* | 3/2012 | Wysopal | G06F 11/3612 |
| | | | | 726/1 |
| 2012/0265985 | A1 | 10/2012 | Leichsenring et al. | |
| 2012/0323717 | A1* | 12/2012 | Kirsch | G06Q 20/0855 |
| | | | | 705/26.1 |
| 2013/0031353 | A1* | 1/2013 | Noro | G06F 1/3212 |
| | | | | 713/100 |
| 2013/0042101 | A1* | 2/2013 | Neumann | H04L 9/3247 |
| | | | | 713/156 |
| 2013/0067568 | A1* | 3/2013 | Obasanjo | H04L 63/0807 |
| | | | | 726/20 |
| 2013/0143609 | A1 | 6/2013 | Richardson et al. | |
| 2013/0160147 | A1* | 6/2013 | Draluk | G06F 21/51 |
| | | | | 726/30 |
| 2013/0337908 | A1 | 12/2013 | Gatto et al. | |
| 2014/0026228 | A1* | 1/2014 | Isozaki | G06F 21/50 |
| | | | | 726/27 |
| 2014/0089113 | A1* | 3/2014 | Desai | G06Q 20/322 |
| | | | | 705/16 |
| 2014/0090077 | A1* | 3/2014 | Jeong | G06F 21/51 |
| | | | | 726/26 |
| 2014/0214610 | A1* | 7/2014 | Moshir | G06Q 20/4016 |
| | | | | 705/26.35 |
| 2014/0282908 | A1* | 9/2014 | Ward | H04W 12/12 |
| | | | | 726/4 |
| 2015/0040224 | A1* | 2/2015 | Litva | G06F 21/554 |
| | | | | 726/23 |
| 2015/0089645 | A1* | 3/2015 | Vandergeest | G06F 21/55 |
| | | | | 726/23 |
| 2015/0143451 | A1* | 5/2015 | Solow | H04L 63/20 |
| | | | | 726/1 |
| 2015/0339482 | A1* | 11/2015 | Wurster | G06F 21/62 |
| | | | | 726/30 |
| 2016/0014149 | A1* | 1/2016 | Bradley | H04L 63/1408 |
| | | | | 726/14 |
| 2016/0044049 | A1* | 2/2016 | Xing | H04L 63/14 |
| | | | | 726/23 |
| 2016/0203313 | A1* | 7/2016 | El-Moussa | G06F 8/65 |
| | | | | 726/23 |
| 2016/0248810 | A1* | 8/2016 | Majaniemi | G06F 9/468 |

FOREIGN PATENT DOCUMENTS

| | | |
|---|---|---|
| EP | 1 826 982 A1 | 8/2007 |
| KR | 10-2005-0026924 A | 3/2005 |
| KR | 10-2014-0068964 A | 6/2014 |
| WO | 2013/063791 A1 | 5/2013 |

* cited by examiner

340

TOKEN DATABASE

| APPLICATION | ALLOWED PERMISSION | | PERIOD INFORMATION |
|---|---|---|---|
| APPLICATION 1 | PERMISSION 1 | PERMISSION 3 | 20120801 / 20131231 |
| APPLICATION 2 | PERMISSION 2 | PERMISSION 3 | 20130501 / 20140131 |
| APPLICATION 3 | PERMISSION 1 | PERMISSION 4 | 20140101 / 20151231 |
| APPLICATION 4 | PERMISSION 3 | PERMISSION 4 | 20120901 / 20121231 |

```
<PERMISSION TOKEN>
        <COMPANY>
710 {       <SOURCE>Samsung</SOURCE>
            <TARGET>K </TARGET>
        </COMPANY>
        <PERMISSION>
720 {       <PEM>android.SAMSUNG.MODIFYTUN </PEM>
        </PERMISSION>
        <DATE>
730 {       <BEGIN>20140813</BEGIN>
            <END>20120813</END>
        <DATE>
740 {   <VERIFY>HASHVALUE</VERIFY>
</PERMISSION TOKEN>
```

TOKEN-BASED SCHEME FOR GRANTING PERMISSIONS

CLAIM OF PRIORITY

This application claims the benefit under 35 U.S.C. § 119(a) of a Korean patent application filed on Sep. 18, 2014 in the Korean Intellectual Property Office and assigned Serial number 10-2014-0124512, the entire disclosure of which is hereby incorporated by reference.

TECHNICAL FIELD

The present disclosure relates to electronic devices in general, and more particularly to a token-based scheme for granting permissions.

BACKGROUND

An electronic device is usually designed to have and execute applications to perform various functions. A user is able to select and download a desired application through an application market (app market; e.g., Android—Play store, or iOS—App store). A key signing is used as a way of verifying integrity of an application distributed through an application market and setting permission according to an operation of the application.

In a security mode using such a key signing, there are arising several problems that an application installed therein has too much permission than the need and it is difficult to interrupt a once-given permission. Moreover, it is necessary to regulate a bad application which uses too much permission than the need to leak personal information and gather illegal information.

SUMMARY

An electronic device comprising: a memory; and at least one processor configured to: install an application by using an installation file associated with the application; grant a permission to the application to use a system resource of the electronic device based on a permission setting token that is included in the installation file; and store, in a database, an indication that the application is granted the permission.

A method comprising: installing, by an electronic device, an application by using an installation file associated with the application; granting at least one permission to the application based on a permission setting token that is included in the installation file; and storing, in a database, an indication that the application is granted the permission.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram of an example of a token database according to various embodiments of the present disclosure;

FIG. 7 is diagram illustrating an example codes of a permission setting token, according to various embodiments of the present disclosure;

Throughout the drawings, it should be noted that like reference numbers are used to depict the same or similar elements, features, and structures.

DETAILED DESCRIPTION

Figure 1:
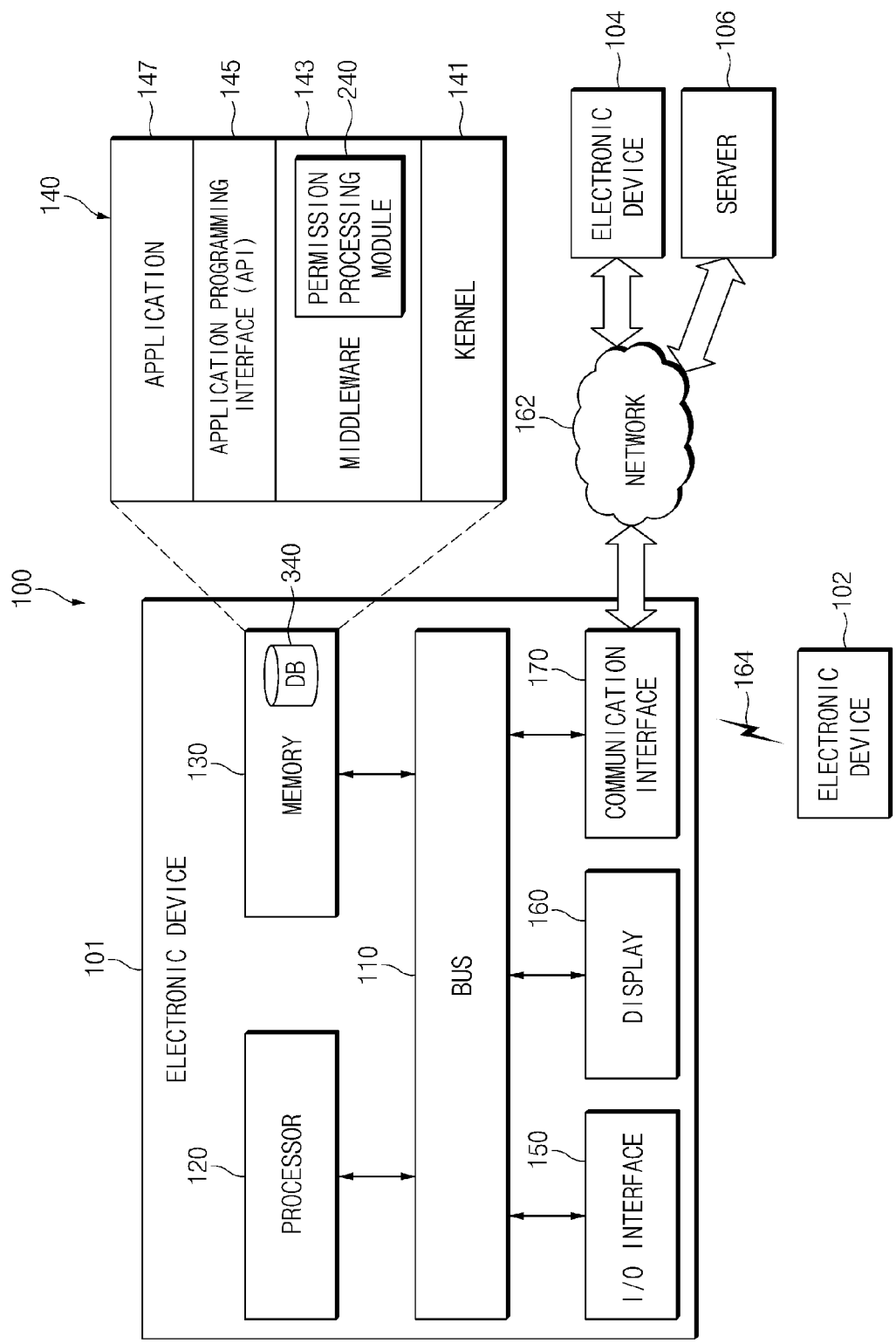
FIG. 1 illustrates is a diagram of an example of an electronic device in a network environment according to various embodiments of the present disclosure.

Hereinafter, various embodiments of the present disclosure will be described in conjunction with the accompanying drawings. Various embodiments described herein, however, may not be intentionally confined in specific embodiments, but should be construed as including diverse modifications, equivalents, and/or alternatives. With respect to the descriptions of the drawings, like reference numerals search to like elements.

The terms "have", "may have", "include", "may include", "comprise", or "may comprise" used herein indicate existence of corresponding features (e.g., numerical values, functions, operations, or components) but does not exclude other features.

As used herein, the terms "A or B", "at least one of A or/and B", or "one or more of A or/and B" may include all allowable combinations which are enumerated together. For example, the terms "A or B", "at least one of A and B", or "at least one of A or B" may indicate all cases of: (1) including at least one A, (2) including at least one B, or (3) including both at least one A, and at least one B.

As used herein, the terms such as "1st", "2nd", "first", "second", and the like may be used to qualify various elements regardless of their order and/or priority, simply differentiating one from another, but do not limit those elements thereto. For example, both a first user device and a second user device indicate different user devices. For example, a first component may be referred to as a second component and vice versa without departing from the scope of the present disclosure.

As used herein, if one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). Otherwise, it will be understood that if one element is referred to as being "directly coupled with/to" or "directly connected with/to" with another element, it may be understood that there is no intervening element existing between them.

In the description or claims, the term "configured to" (or "set to") may be changeable with other implicative meanings such as "suitable for", "having the capacity to", "designed to", "adapted to", "made to", or "capable of", and may not simply indicate "specifically designed to". Alternatively, in some circumstances, a term "a device configured to" may indicate that the device "may do" something together with other devices or components. For instance, a term "a processor configured to (or set to) perform A, B, and C" may indicate a generic-purpose processor (e.g., CPU or application processor) capable of performing its relevant operations by executing one or more software or programs which is stored in an exclusive processor (e.g., embedded processor), which is prepared for the operations, or in a memory.

The terms used in this specification are just used to describe various embodiments of the present disclosure and may not be intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal detect unless expressly so defined herein in various embodiments of the present disclosure. In some cases, terms even defined in the specification may not be understood as excluding embodiments of the present disclosure.

An electronic device according to various embodiments of the present disclosure may include, for example, at least one of smartphones, tablet personal computers (tablet PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, wearable devices (e.g., electronic glasses, or head-mounted-devices (HMDs), electronic apparel, electronic bracelets, electronic necklaces, electronic appcessories, electronic tattoos, smart mirrors, smart watches, and the like.

In some embodiments, an electronic device may be a smart home appliance. The smart home appliance, for example, may include at least one of televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, Google TV™, and the like), game consoles (e.g., Xbox™, PlayStation™, and the like), electronic dictionaries, electronic keys, camcorders, electronic picture frames, and the like.

In other embodiments, an electronic device may include at least one of diverse medical devices (e.g., portable medical measuring instruments (blood-sugar measuring instruments, heart-pulsation measuring instruments, blood-pressure measuring instruments, or body-temperature measuring instruments), magnetic resonance angiography (MRAs) equipment, magnetic resonance imaging (MRI) equipment, computed tomography (CT) equipment, scanners, and ultrasonic devices), navigation device, global positioning system (GPS) receiver, event data recorder (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs) for financial agencies, points of sales (POSs) for stores, and internet of things (e.g., electric bulbs, diverse sensors, electric or gas meter, spring cooler units, fire alarms, thermostats, road lamps, toasters, exercise implements, hot water tanks, boilers, and the like).

According to some embodiments, an electronic device may include at least one of parts of furniture or buildings/structures having communication functions, electronic boards, electronic-signature receiving devices, projectors, and diverse measuring instruments (e.g., water meters, electricity meters, gas meters, and wave meters) including metal cases. In various embodiments, an electronic device may be one or more combinations of the above-mentioned devices. Electronic devices according to some embodiments may be flexible electronic devices. Additionally, electronic devices according to various embodiments of the present disclosure may not be restrictive to the above-mentioned devices, rather may include new electronic devices emerging by way of technical development.

Hereinafter, an electronic device according to various embodiments will be described in conjunction with the accompanying drawings. In description for various embodiments, the term "user" may refer to a person using an electronic device or a device (e.g., an artificial intelligent electronic device) using an electronic device.

FIG. 1 illustrates is a diagram of an example of an electronic device in a network environment according to various embodiments of the present disclosure.

Referring to FIG. 1, an electronic device 101 in a network environment 100 according to various embodiments of the present disclosure will be described below. The electronic device 101 may include a bus 110, a processor 120, a memory 130, an input/output (I/O) interface 150, a display 160, and a communication interface 170. In some embodiments, the electronic device 101 may exclude at least one of the elements therefrom or further include another element therein.

The bus 110, for example, may include a circuit to connect the elements 110~170 each other and relay communication (control messages and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Additionally or alternatively, the processor 120 may include at least one or more of a central processing unit (CPU), an application processor (AP), or a communication processor (CP). The processor 120, for example, may execute computation or data operation for control and/or communication of at least one of other elements of the electronic device 101.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. The memory 130 may include a volatile and/or non-volatile memory. The memory 130 may store, for example, instructions or data which are involved in at least one of other elements in the electronic device 101. According to an embodiment, the memory 130 may store a software and/or program 140 therein. The program 140 may include, for example, a kernel 141, a middleware 143, an application programming interface (API) 145, and/or an application program (or "application") 147. At least a part of the kernel 141, the middleware 143, or the API 145 may be referred to as an operation system (OS).

According to various embodiments, the memory 130 may include a token database 340. The token database 340 may store information about permission and an effective permission period which are allowed to each application 147. The token database 340 may be referred in instances in which the application 147 is executed. Permission of the application 147 may be set based on information stored in the token database 340.

The kernel 141 may control or manage, for example, system resources (e.g., the bus 110, the processor 120, or the memory 130) which are used for executing operations or functions implemented in other programs (e.g., the middleware 143, the API 145, or the application program 147). Additionally, the kernel 141 may provide an interface capable of controlling or managing system resources by approaching individual elements of the electronic device 101 from the middleware 143, the API 145, or the application program 147.

The middleware 143 may perform a mediating function to allow, for example, the API 145 or the application program 147 to communicate and exchange data with the kernel 141. Additionally, in relation to work requests received from the application program 147, the middleware 143 may perform, for example, a control operation (e.g., scheduling or load balancing) for the work request by using a method of designating or arranging the priority, which permits the electronic device 101 to use a system resource (e.g., the bus 110, the processor 120, or the memory 130), into at least one application of the application program 147.

In various embodiments, the middleware 143 may include a permission processing module 240. The permission processing module 240 may perform a function of setting permission of each application. In instances in which an installation file of an application includes permission information independent of a key signing mode, the permission processing module 240 may set permission for the application, without setting permission by the key signing, according to the permission information. A configuration and operation of the permission setting module 240 will be described in conjunction with FIGS. 3 to 9.

The API 145 may be, for example, an interface for allowing the application 147 to control a function which is provided from the kernel 141 or the middleware 143. For example, the API 145 may include at least one interface or function (e.g., an instruction) for file control, window control, or character control.

The input/output interface 150 may act as, for example, an interface capable of transferring instructions or data, which are input from a user or another external device, to another element (or other elements) of the electronic device 101. Additionally, the input/output interface 150 may output instructions or data, which are received from another element (or other elements) of the electronic device 101, to a user or another external device.

The display 160 may include, for example, a liquid crystal display (LCD), a light-emitting diode (LED), an organic LED (OLED) display, a microelectromechanical system (MEMS) display, or an electronic paper. The display 160 may display, for example, diverse contents (e.g., text, image, video, icon, or symbol) to a user. The display 160 may include a touch screen, and for example receive an input of touch, gesture, approach, or hovering which is made by using an electronic pen or a part of a user's body.

The communication interface 170 may set, for example, a communication condition between the electronic device 101 and an external electronic device (e.g., a first external electronic device 102, a second external electronic device, or a server 106). For example, the communication interface 170 may communicate with an external electronic device (e.g., the second external electronic device 104 or the server system 106) in connection with a network 162 through wireless communication (or local wireless communication) or wired communication.

The wireless communication may use, for example, at least one of LTE, LTE-A, CDMA, WCDMA, UMTS, WiBro, or GSM. The wired communication may include, for example, at least one of universal serial bus (USB), high definition multimedia interface (HDMI), recommended standard 232 (RS-232), or plain old telephone service (POTS). The network 162 may include a telecommunication network, for example, at least one of a computer network (e.g., LAN or WLAN), Internet, or a telecommunication network.

Each of the first and second external electronic devices 102 and 104 may be same with or different from the electronic device 101. According an embodiment, the server 106 may include a group of one or more servers. According to various embodiments, all or a part of operations executed in the electronic device 101 may be executed in another one or a plurality of electronic devices (e.g., the electronic device 102 or 104, or the server 106). According to an embodiment, in in instances in which there is a need of performing a function or service automatically or by a request for the electronic device 101, the electronic device 101 may request at least a part of the function or service, additionally or instead of executing by itself, from another device (e.g., the electronic device 102 or 104, or the server 106). Such another device (e.g., the electronic device 102 or 104, or the server 106) may execute such a requested or additional function and then transfer a result of the execution of the function. The electronic device 101 may process a received result, as it is or additionally, to provide the request function or service. To this end, for example, it may be available to adopt a cloud computing, distributed computing, or client-server computing technique.

According to various embodiments, the electronic device 101 may provide permission information stored at the token database 340 to the external electronic device (e.g., the electronic device 102 or 104, or the server 106), or may receive a signal, which modifies the permission information, from the external electronic device. The electronic device 101 may update, after installing an application, permission through the external electronic device in instances in which there is a need of modifying or correcting the permission given thereto.

Figure 2:
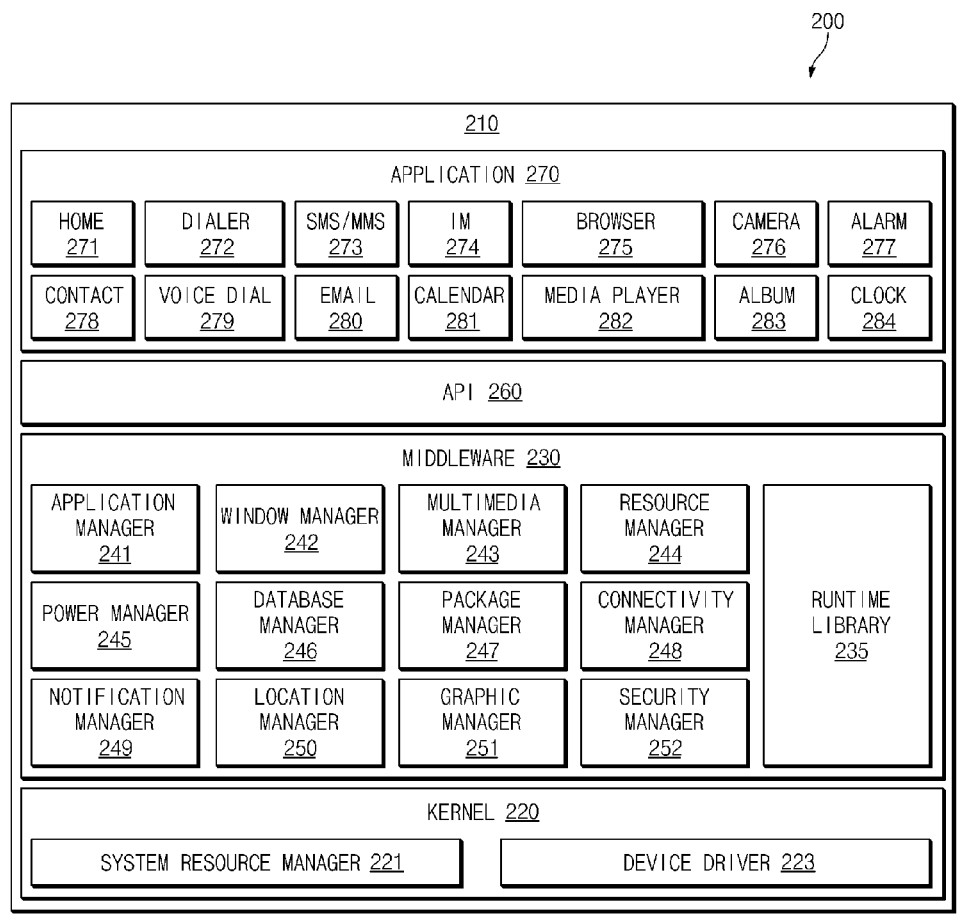
FIG. 2 is a block diagram of an example of a program module according to various embodiments of the present disclosure.

FIG. 2 is a block diagram of an example of a program module according to various embodiments of the present disclosure.

Referring to FIG. 2, according to an embodiment, the program module 210 may include an operating system (OS) to control resources relevant to an electronic device (e.g., the electronic device 101), and/or diverse applications (e.g., the application 147) driven on the operating system. The operating system may be, for example, Android, iOS, Windows, Symbian, Tizen, or Bada.

The program module 210 may include a kernel 220, a middleware 230, and/or an application 270. At least a part of the program module 210 may be preloaded into an electronic device, or may be downloadable from a server (e.g., the server system 106).

The kernel 220 (e.g., the kernel 141 of FIG. 1) may include, for example, a system resource manager 221 or a device driver 223. The system resource manager 221 may perform control, allocation, or retrieval of system resources. According to an embodiment, the system resource manager 221 may include a process managing part, a memory managing part, or a file system managing part. The device driver 223 may include, for example, a display driver, a camera driver, a Bluetooth driver, a common memory driver, an USB driver, a keypad driver, a WiFi driver, an audio driver, or an inter-process communication (IPC) driver.

The middleware 230 may provide, for example, a function necessary for the application 270 in common, or provide diverse functions to the application 270 through the API 260 to allow the application 270 to efficiently use limited system resources of the electronic device. According to an embodiment, the middleware 230 (e.g., the middleware 143) may include at least one of a runtime library 235, a permission processing module 240, an installing module (package manager) 241, an execution module (activity manager) 242, an application manager 243, a window manager 244, a multimedia manager 247, a resource manager 246, a power manager 247, a database manager 248, a connectivity manager 249, a notification manager 250, or a location manager 251.

The runtime library 235 may include, for example, a library module which is used by a compiler to add a new function through a programming language while the application 270 is being executed. The runtime library 235 may perform input/output management, memory management, or functions about arithmetic functions.

The permission processing module 240 may set permission of each application. The permission processing module 240 may determine whether there is included a permission setting token of an installation file of an application. The permission setting token may be data defining a permission range which can be used by an application. The permission setting token may include information about permission setting (hereinafter, referred to as "permission information"), such as permission, period information (e.g., effective period), authentication information, and so on.

In various embodiments, the permission processing module 240 may check validity of a permission setting token, and store permission information in the token database 340 where the permission setting token is valid. Permission information stored in the token database 340 may be referred in execution of an application.

The installing module 241 (e.g., package manager) may manage installation or update of an application which is distributed in the form of package file. In various embodiments, the package manager 241 may be implemented in a form including at least a part of the permission processing module 240.

The execution module 242 (e.g., activity manager) may perform functions such as execution and termination of an application, intent transfer between applications, and so on. The execution module 242 may execute an application by directly referring the token database 340 if the application is executed, or referring the token database 340 through the permission processing module 240.

The application manager 243, for example, may manage a life cycle of at least one application of the application 270. The window manager 244 may manage a GUI resource which is used in a screen. The multimedia manager 245 may identify a format necessary for playing diverse media files, and perform an encoding or decoding work for media files by using a codec suitable for the format. The resource manager 246 may manage resources such as a storage space, memory, or source code of at least one application of the application 270.

The power manager 247, for example, may operate with a basic input/output system (BIOS) to manage a battery or power, and provide power information for an operation of an electronic device. The database manager 248 may generate, search, or modify a database which is to be used in at least one application of the application 270.

The connectivity manager 249, for example, may manage wireless connection such as WiFi or Bluetooth. The notification manager 250 may display or notify an event such as arrival message, promise, or proximity notification in a mode that does not disturb a user. The location manager 251 may manage location information of an electronic device. According to an embodiment, in instances in which an electronic device (e.g., the electronic device 101) includes a telephony function, the middleware 230 may further includes a telephony manager for managing a voice or image call function of the electronic device.

The middleware 230 may include a middleware module to form a combination of diverse functions of the above-described elements. The middleware 230 may provide a specialized module by a kind of operating system in purpose of offering differentiated functions. Additionally, the middleware 230 may remove a part of the preexisting elements, dynamically, or add a new element thereto.

The API 260 (e.g., the API 145), for example, may be a set of API programming functions, and may be provided in a configuration which is variable depending on an operating system. For example, in in instances in which an operating system is Android or iOS, it may be permissible to provide one API set per platform. In in instances in which an operating system is Tizen, it may be permissible to provide two or more API sets per platform.

The application 270 (e.g., the application 147), for example, may include one or more applications capable of providing functions for a home 271, a dialer 272, an SMS/MMS 273, an instant message (IM) 274, a browser 275, a camera 276, an alarm 277, a contact 278, a voice dial 279, an e-mail 280, a calendar 281, a media player 282, am album 283, and a timepiece 284, or for offering health care (e.g., measuring an exercise quantity or blood sugar) or environmental information (e.g., atmospheric pressure, humidity, or temperature).

According to an embodiment, the application 270 may include an application (hereinafter, referred to as "information exchanging application" for descriptive convenience) to support information exchange between the electronic device (e.g., the electronic device 101) and an external electronic device (e.g., the electronic device 102 or 104). The information exchanging application, for example, may include a notification relay application for transmitting specific information to the external electronic device, or a device management application for managing the external electronic device.

For example, the notification relay application may include a function of transmitting notification information, which arise from other applications (e.g., the applications for SMS/MMS, e-mail, health care, or environmental information), to an external electronic device (e.g., the electronic device 102 or 104). Additionally, the notification relay application, for example, may receive notification information from an external electronic device and provide the notification information to a user. The device management application, for example, may manage (e.g., install, delete, or update) at least one function (e.g., turn-on/turn-off of an external electronic device itself (or a part of components) or adjustment of brightness (or resolution) of a display) of the external electronic device (e.g., the electronic device 104) which communicates with the electronic device 101, an application operating in the external electronic device, or service (e.g., call service or message service) provided from the external electronic device.

According to an embodiment, the application 270 may include an application (e.g., a health care application) which is assigned thereto in accordance with a property (e.g., a property of a mobile medical device as a kind of electronic device) of the external electronic device (e.g., the electronic device 102 or 104). According to an embodiment, the application 270 may include an application which is received from an external electronic device (e.g., the electronic device 102 or 104). According to an embodiment, the application 270 may include a preloaded application or a third party application which is downloadable from a server. The titles of elements of the program module 210 according to the illustrated embodiment may be modifiable according to kinds of operating systems.

According to various embodiments, at least a part of the program module 210 may be implemented in software, firmware, hardware, or at least two or more combinations among them. At least a part of the program module 210, for example, may be implemented (e.g., executed) by a processor (e.g., the processor 210). At least a part of the program module 210 may include, for example, a module, a program, a routine, a set of instructions, or a process for performing one or more functions.

Figure 3:
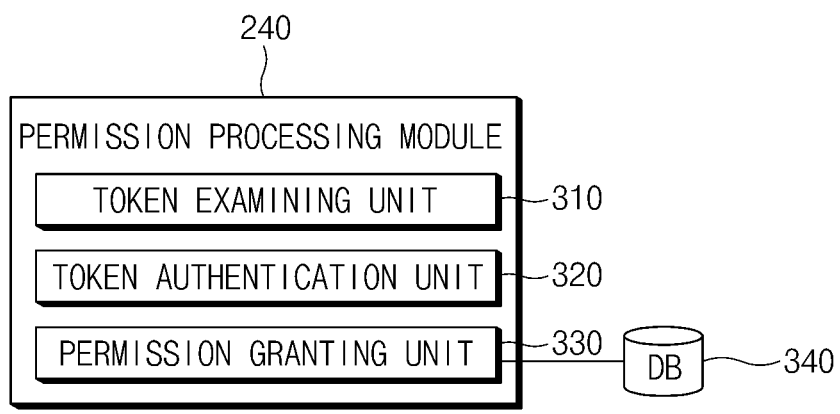
FIG. 3 is a diagram of an example of a permission processing module according to various embodiments of the present disclosure.

FIG. 3 is a diagram of an example of a permission processing module according to various embodiments of the present disclosure.

Referring to FIG. 3, the permission processing module 240 may include a token examination unit 310, a token authentication unit 320, and a permission granting unit 330.

The token examination unit 310 may determine whether an installation file for installing an application includes a permission setting token. The permission setting token may include any suitable type of data structure (or information item) that defines a permission range which can be used by an application. The permission range, in some implementations, may include at least one of (i) a list of one or more system resources of the electronic device 100 which the application is permitted to access when being executed by the electronic device, (ii) a list of one or more functions of the application that are permitted to be executed, (iii) information about the electronic device 100 (e.g., network connecting, processor occupation) which the application is allowed to access, and (iv) a list of other applications which the application is allowed to execute. In some implementations, the one or more system resources may include a hardware resource of the electronic device 100 (e.g., a camera), a file (e.g., an image file), a data structure (e.g., an address table), and/or any other suitable type of system resource. The permission setting token may include permission information such as permission, effective period, authentication information, and so on, which are usable in an application.

According to various embodiments, an application whose installation file does not include a permission setting token may be set with permission according to a key signing which is included in the installation file.

The token authentication unit 320 may check validity of a permission setting token. A permission setting token may include authentication information. The token authentication unit 320 may check validity of the authentication information in a specific mode. The token authentication unit 320 may function to prevent permission information from being modified by a third party. In various embodiments, the token authentication unit 320 may check validity of a permission setting token by a key signing mode.

The permission granting unit 330 may store authenticated permission information in the token database 340. The stored permission information may be referred in instances in which an application driven in the electronic device 101 is executed and may allow a specific function to be used or regulated in use. In various embodiments, the permission granting unit 330 may identify permission information, which is included in the token database 340, by a call of the execution module 242.

The token database 340 may store permission information which is allowed to each application. The token database 340 may store a list of installed applications, and one or more permissions that are associated with each application. In some implementations, each of the permissions may include at least one of (i) an indication of a system resource which the application is allowed to access, (ii) an indication of a function of the application that is allowed to be executed, (iii) an indication of information about the electronic device 100 (e.g., network connecting, processor occupation) which the application is allowed to access, or (iv) an indication of other applications which the application is allowed to execute. Additionally, the token database 340 may further include period information (e.g., effective period), developer information, and so on. In various embodiments, the token database 340 may be implemented in the form of a file where the application list and relevant information are continuously arranged. In various embodiments, the token database 340 may be synchronized or updated through an external electronic device (e.g., the server 106). Although in FIGS. 1 and 3, the database 240 is depicted as being integrated in the electronic device 101, in some implementations, the database 340 may be located in a remote server and accessed over a communications network. According to various embodiments, an electronic device installing and driving an application may include an installing module to install the application through an installation file, a permission processing module to set permission of the application by using a permission setting token which is included in the installation file, and a token database to store permission information which is included in the permission setting token.

According to various embodiments, the permission processing module may include a token examination unit for determining whether the installation file includes the permission setting token. In instances in which the installation file does not include the permission setting token, the token examination unit may terminate a permission setting process using the permission setting token.

According to various embodiments, the permission processing module may further include a token authentication unit for verifying validity of the permission setting token. The token authentication unit checks authentication information, which is included in the permission setting token, through a specific algorithm and may determine validity of the permission setting token.

According to various embodiments, the permission processing module may further include a permission granting unit for storing the permission information in the token database where the permission setting token is valid. If the application is executed, the permission granting unit may search the token database to give specific permission. In various embodiments, in in instances in which there is a need of using a function by permission specified by the application, the permission granting unit may search the token database to give the permission.

According to various embodiments, the permission setting token may include information about permission, which is usable by the application, and an effective period of the permission. The permission setting token may set the effective period for each of the permission which is usable by the application.

According to various embodiments, the token database may be updated by a control signal which is received from an external electronic device. The permission setting token may be signed with a key which identifies a manufacturer producing the electronic device.

According to various embodiments, the electronic device further includes an execution module to execute the application, and the execution module may execute the application according to permission which is set in the permission setting token. The execution module may search the token database directly, or search the token database through the permission processing module.

Figure 4:
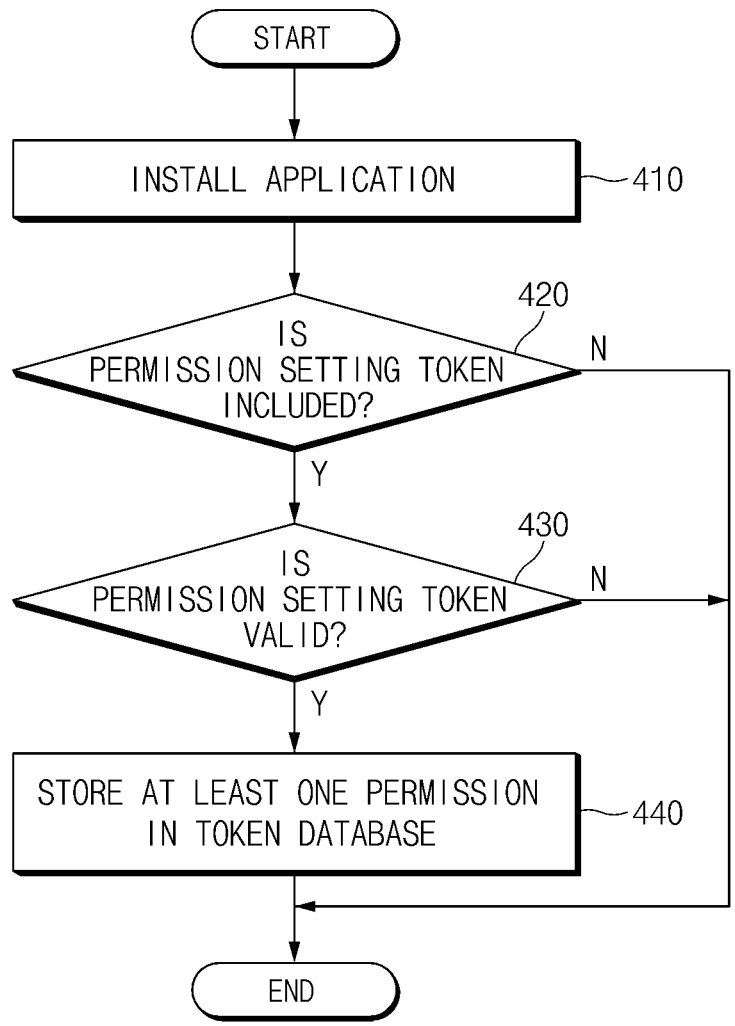
FIG. 4 is a flowchart of an example of a process, according to embodiments of the present disclosure.

FIG. 4 is a flowchart of an example of a process, according to embodiments of the present disclosure.

Referring to FIG. 4, in operation 410, an installing module 241 may install an application through an installation file. For example, in an Android operating system, the installing module 241 may be a package manager and the installation file may be a file having an .apk extension. The installing module 241 may check presence and validity of a permission setting token associated with the installation file through a permission processing module 240 after an application starts to be installed.

In operation 420, a token examination unit 310 may determine whether the installation file includes the permission setting token. The permission setting token may be data defining a permission range which is usable by an application. The permission setting token may include permission information such as permission, period information (e.g., effective period), authentication information, and so on, which are usable by an application.

The token examination unit 310 may not perform an additional work where the installation file does not include the permission setting token. Permission of an application which does not include the permission setting token may be set by a mode checking validity of a key signing.

In operation 430, a token authentication unit 320 may verify validity of a permission setting token. The permission setting token may include additional authentication information (e.g., hash values). The token authentication unit 320 may check authentication information in a specific mode and may determine whether the permission setting token has been inserted by a specific developer or manufacturer, or corrected or modified without permission.

For example, a developer (or developing company) of an application may provide values, which are hashed by a specific hash algorithm from certificate information and a specific file (e.g., classes.dex), to a manufacturer of an electronic device 101. A manufacturer may sign the authentication information and specific files by a key of the manufacturer and may generate a token. The token authentication unit 320 may validate authentication information, which is included in the permission setting token, through the hash algorithm and may determine issue normality and integrity of the permission setting token.

According to various embodiments, in in instances in which the permission setting token is invalid, the token authentication unit 320 may interrupt the installation of the application and/or notify the user that the permission setting token associated with the application cannot be validated.

In operation 440, a permission granting unit 330 may store may store at least one permission in a token database 340 if the permission setting token is valid. In some implementations, the indication of permission may identify at least one of (i) a system resource of the electronic device 101, which the application is allowed to access or (2) an indication of a function of the application that is permitted to be executed. The authentication information may include an application list, kinds of permission allowed respectively to applications, effective periods, and so on.

Figure 5:
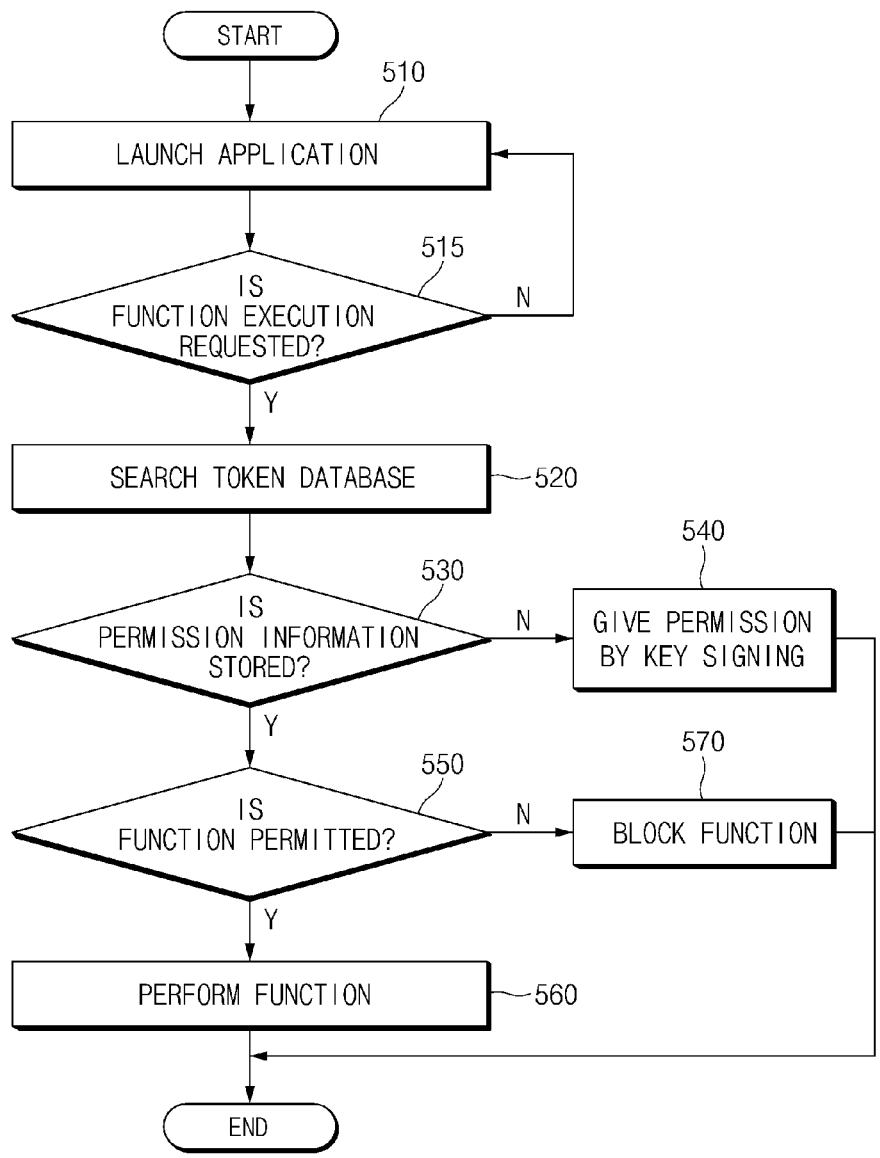
FIG. 5 is a flowchart of an example of a process, according to various embodiments of the present disclosure.

FIG. 5 is a flowchart of an example of a process, according to various embodiments of the present disclosure.

Referring to FIG. 5, in operation 510, an execution module (e.g., activity manager) 242 may launch an application. For example, the execution module 242 may execute an application which is selected by a user or called by another application.

According to various embodiments, in operation 515, the execution module 242 may determine whether there is an execution request for a particular function (or operation). For example, in instances in which a function (e.g., camera function or address table calling) necessary for checking specific permission in an application needs to be executed, the execution module 242 may perform a process (operations 520 to 560) of checking permission by a permission setting token or a key signing.

In operation 520, the execution module 242 may search a token database 340 for one or more permissions associated with the launched application. The token database 340 may store permission information such as an application list, kinds of permission, effective periods, and so on.

According to various embodiments, the execution module 242 may search the token database 340 through a permission processing module 240. The permission processing module 240 may check permission information of the token database 340 through a permission granting unit 330 and may provide the result to the execution module 242. Although the following description proceeds about the embodiments where the token database is directly referred by the execution module 242, various embodiments of the present disclosure may not be restrictive hereto.

In operation 530, based on the outcome of the search, the execution module 242 may determine whether the token database 340 includes permission information associated with the application. In some implementations, permission information of an application with the permission setting token may be stored in the token database 340 when the application is installed, but permission information of an application which does not include an additional permission setting token may not be stored in the token database 340.

In operation 540, in in instances in which permission information of an application is not stored in the token database 340, the execution module 242 may allow the application to operate according to allocated permission by a key signing mode.

In operation 550, based on the outcome of the search, the execution module 242 may determine whether the function whose execution is requested is permitted to be executed. For example, the execution module 242 may determine whether a function to be used in an application is defined in permission information and, even where it is defined, whether it is ranged within an effective period.

In operation 560, if the execution of the function is permitted, the function may be executed.

In operation 570, when the function's execution is not permitted (or otherwise restricted), the execution module 242 may prevent the function from being executed and/or executed the function in a restricted manner.

According to various embodiments, a method of setting permission of an application driven in an electronic device may include installing the application through an installation file, determining whether the installation file includes a permission setting token, checking validity of the permission setting token, and storing permission information in a token database if the permission setting token is valid.

According to various embodiments, the method may further include setting permission by referring the token database if the application is executed. In various embodiments, in instances in which there is a need of using a function requiring permission specified by the application, the method may further include giving the permission by referring the token database.

FIG. 6 is a diagram of an example of a token database according to various embodiments of the present disclosure.

Referring to FIG. 6, a token database 340 may include an application list 610, permission information 620, and period information 630. However, FIG. 6 is just illustrative and various embodiments of the present disclosure may not be restrictive hereto.

The application list 610 may show an application, which is installed by an installation file including a permission setting token, from among installed applications. In various embodiments, the application list 610 may include a list of all applications installed in an electronic device 101. In this regard, an application of which the permission is undefined by an additional permission setting token may operate according to permission which is allocated by a general key signing mode.

The permission information 620 may show kinds of permission allowed respectively to applications. For example, Application 1 may be allowed for Permission 1 (e.g., for use of a camera module), Permission 3 (e.g., for use of a stored image), and Permission 4 (e.g., for checking contents of an address table).

The period information 630 may show effective periods of permission allowed respectively to applications. Even though permission defined in the token database 340 is out of an effective period, the execution module 242 may regulate a corresponding function and it may interrupt an application or may provide a relevant message to a user. In various embodiments, different period information may be provided for each permission information item. For example, a first permission information item may be associated with a second respective period.

FIG. 7 is diagram illustrating an example codes of a permission setting token, according to various embodiments of the present disclosure.

Referring to FIG. 7, a permission setting token may include subject information 710, permission information 720, period information 730, and authentication information 740. However, FIG. 7 is just illustrative and various embodiments of the present disclosure may not be restrictive hereto.

The subject information 710 may include identification information of a manufacturer or developer defining the permission setting token 701. For example, in instances in which a manufacturer sets permission for applications which are made by a multiplicity of developers, the subject information 710 may include identification information about a manufacturer, who defines the permission, and a developer who requests the permission definition.

The permission information 720 may define permission which is allowed to each application. For example, the permission information 720 may define Permission 1 (e.g., for use of a camera module), Permission 3 (e.g., for use of a stored image), and Permission 4 (e.g., for checking contents of an address table), to Application 1.

The period information 730 may include effective periods of permission allowed respectively to applications. In various embodiments, the period information 730 may define a termination time of permission allowed thereto, or may define a temporary suspension period of permission allowed thereto.

The authentication information 740 may be used for checking validity of a permission setting token in the token authentication unit 320. The authentication information 740 may correspond to hash values or authentication codes which are able to be checked according to a specific mode. The authentication information 740 may prevent permission information from being corrected or modified by a third party.

Figure 8:
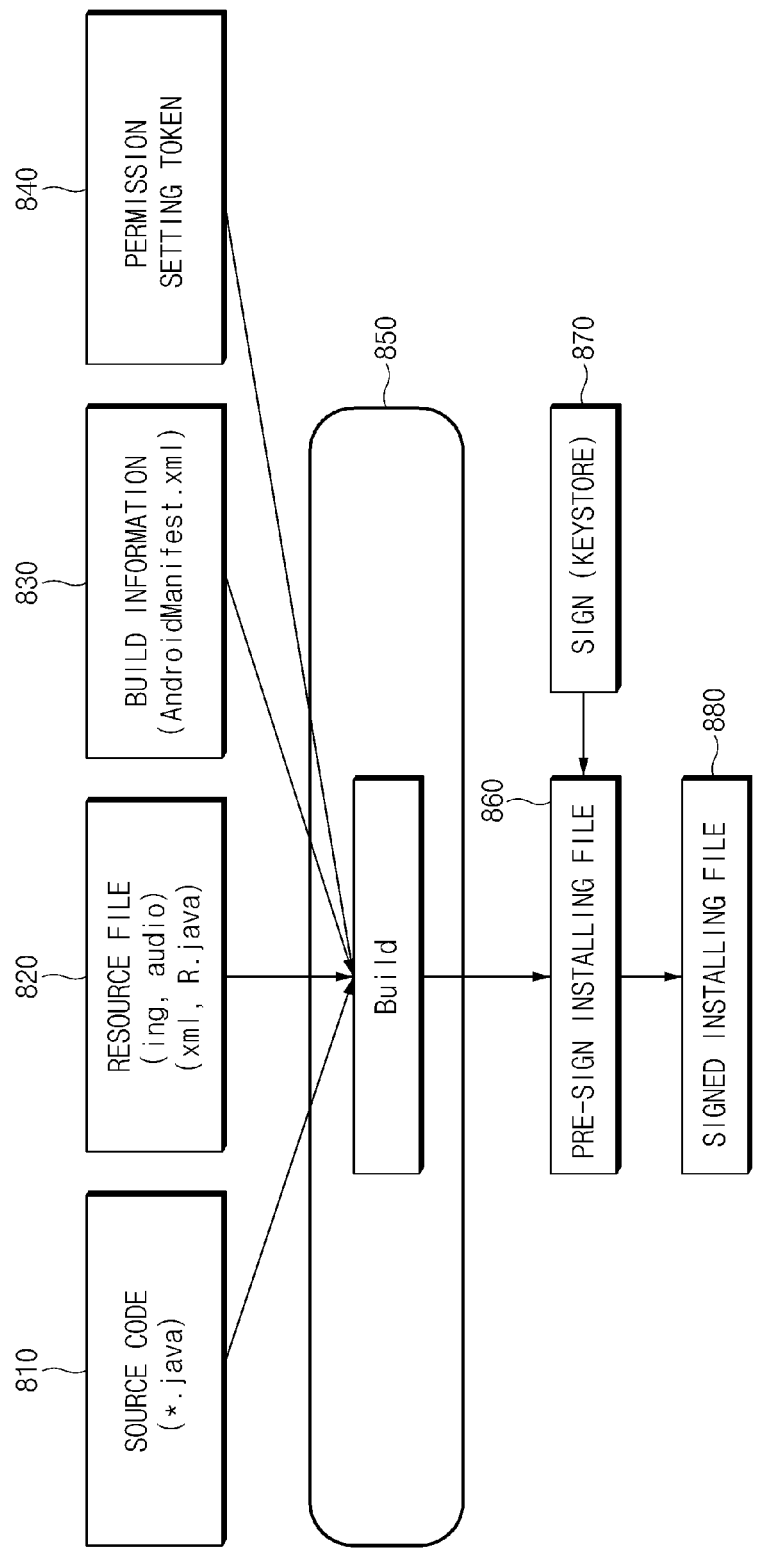
FIG. 8 is a configuration diagram illustrating an example of an installation file for an application including a permission setting token, according to various embodiments of the present disclosure.

FIG. 8 is a configuration diagram illustrating an example of an installation file for an application including a permission setting token, according to various embodiments of the present disclosure.

Referring to FIG. 8, an installation file of an application may include a source code 810, a resource file 820, build information 830, and a permission setting token 840. This configuration is exemplarily classified in functionality and various embodiments of the present disclosure may not restrictive hereto. For example, the permission setting token 840 may be implemented to be included in the build information 830.

The source code 810 may be data which form contents of an application input by a developer. The resource file 820 may correspond to an image or audio file used for driving an application. The build information 830 may be a file (e.g., AndroidMainfest.xml) which contains information about application elements.

The permission setting token 840 may be data which defines a permission range usable by an application. The permission setting token 840 may include permission information such as permission, effective period, authentication information, which are usable by an application. The permission setting token 840 may be defined and inserted by a developer or manufacturer.

The source code 810, the resource file 820, the build information 830, and the permission setting token 840 may be integrated into one installation file through a packaging process 850. The integrated installation file (a pre-sign installation file 860) may be signed by a key of a manufacturer or developer.

According to various embodiments, the permission setting token 840 may be inserted and key-signed by a manufacturer who produces an electronic device 101. If an application is developed, the developer may provide a manufacturer configuration information of the application and permission information necessary for driving the application. The manufacturer may examine necessity of setting permission based on information which is provided from the developer. The manufacturer may key-sign after defining a permission setting token required thereto and inserting an installation file thereinto.

Figure 9:
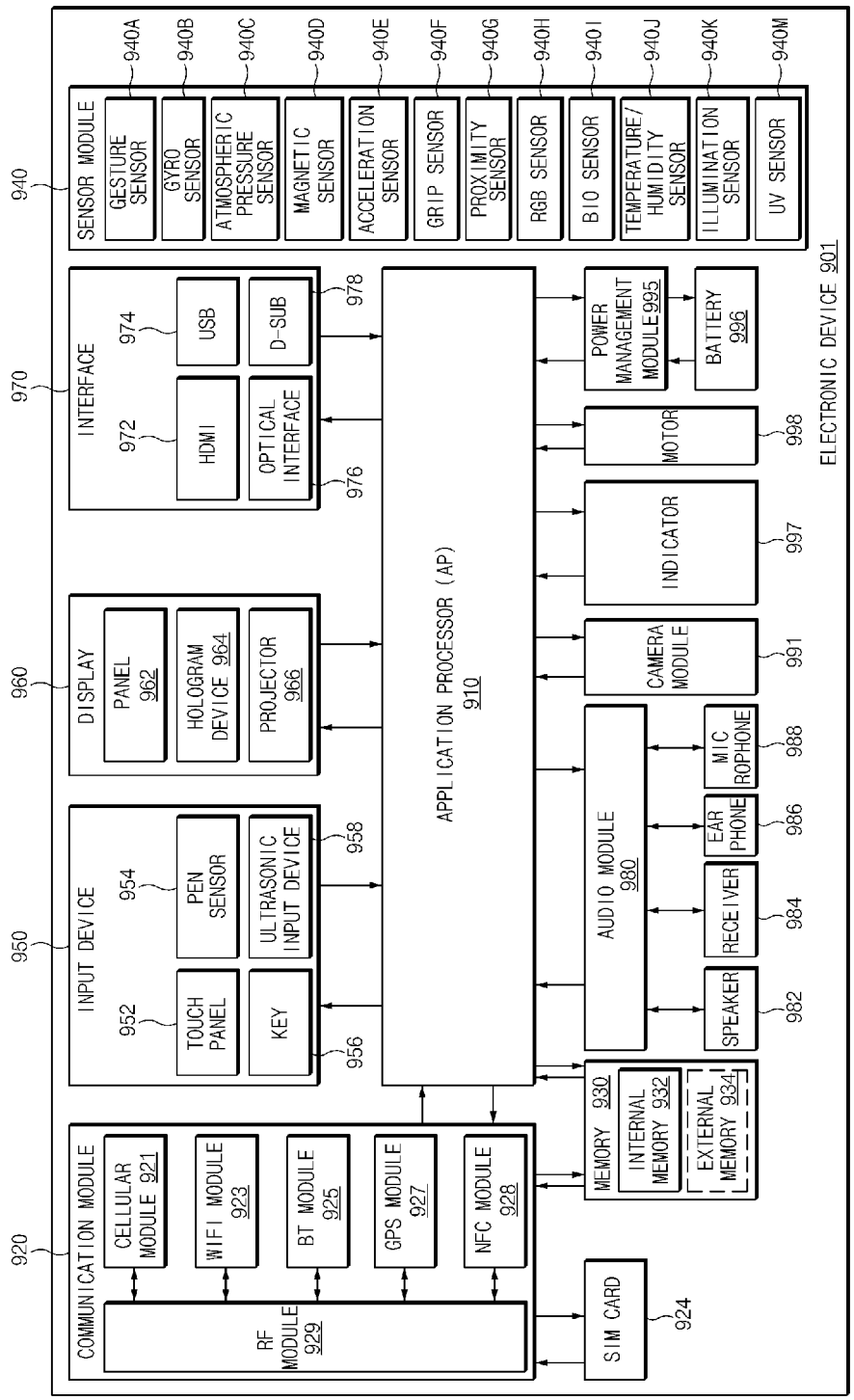
FIG. 9 is a block diagram of an example of an electronic device, according to various embodiments of the present disclosure.

FIG. 9 is a block diagram of an example of an electronic device, according to various embodiments of the present disclosure.

Referring to FIG. 9, the electronic device 901 may include, for example, all or a part of elements of the electronic device 101 shown in FIG. 1. The electronic device 901 may include an application processors (AP) 910, a communication module 920, a subscriber identification module (SIM) card 924, a memory 930, a sensor module 940, an input unit 950, a display 960, an interface 970, an audio module 980, a camera module 991, a power management module 995, a battery 996, an indicator 997, or a motor 998.

The AP 910, for example, may drive an operating system or an application program to control a plurality of hardware or software elements connected to the AP 910, and may process and compute a variety of diverse data. The AP 910, for example, may be implemented in a system-on-chip (SoC), for example. According to an embodiment, the AP 910 may further include a graphic processing unit (GPU) and/or an image signal processor. The AP 910 may even include at least a part (e.g., a cellular module 921) of the elements shown in FIG. 9. The AP 910 may load and process instructions or data, which are received from at least one of other elements (e.g., a non-volatile memory), and store diverse data into such a non-volatile memory.

The communication module 920 may be the same as or similar to the communication interface 170 of FIG. 1 in configuration. For example, the communication module 920 may include a cellular module 921, a WiFi module 923, a Bluetooth (BT) module 925, a GPS module 927, an NFC module 928, and a radio frequency (RF) module 929.

The cellular module 921, for example, may provide a voice call, a video call, a character service, or an Internet service through a communication network. According to an embodiment, the cellular module 921 may perform identification and authentication of an electronic device using a subscriber identification module (e.g., a SIM card) 924 in a communication network. According to an embodiment, the cellular module 921 may perform at least a portion of functions which can be provided by the AP 910. According to an embodiment, the cellular module 921 may include a communication processor (CP).

Each of the WiFi module 923, the BT module 925, the GPS module 927, and the NFC module 928, for example, may include a processor for processing data transmitted and received through a corresponding module. In some embodiments, at least a part (e.g., two or more) of the cellular module 921, the WiFi module 923, the BT module 925, the GPS module 927, and the NFC module 928 may be included in one integrated circuit (IC) or IC package.

The RF module 929, for example, may transmit and receive communication signals (e.g., RF signals). The RF module 929 may include a transceiver, a power amplifier module (PAM), a frequency filter, a low noise amplifier (LNA), or an antenna. According to another embodiment, at least one of the cellular module 921, the WiFi module 923, the BT module 925, the GPS module 927, and the NFC module 928 may transmit and receive an RF signal through an additional RF module.

The SIM card 924, for example, may include a card and/or an embedded SIM, which have/has a subscriber identification module, and include unique identifying information (e.g., integrated circuit card identifier (ICCID)) or subscriber information (e.g., integrated mobile subscriber identify (IMSI)).

The memory 930 (e.g., the memory 130) may include, for example, an embedded memory 932 or an external memory 934. For example, the embedded memory 932 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, or solid state drive (SSD).

The external memory 934 may further include a flash drive, for example, a compact flash (CF), a secure digital (SD), a micro-secure digital (SD), a mini-SD, an extreme digital (xD), or a memory stick. The external memory 934 may be functionally and/or physically connected with the electronic device 901 through diverse interfaces.

The sensor module 940, for example, may measure a physical quantity, or detect an operation state of the electronic device 901, to convert the measured or detected information to an electric signal. The sensor module 940 may include at least one of a gesture sensor 940A, a gyro sensor 940B, a pressure sensor 940C, a magnetic sensor 940D, an acceleration sensor 940E, a grip sensor 940F, a proximity sensor 940G, a color sensor 940H (e.g., RGB sensor), a living body sensor 940I, a temperature/humidity sensor 940J, an illuminance sensor 940K, or an UV sensor 940M. Additionally or alternatively, for example, the sensor module 940 may include an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor, for example. The sensor module 940 may further include a control circuit for controlling at least one or more sensors included therein. In some embodiments, the electronic device 901 may further include a processor, which is configured to control the sensor module 940, as a part or additional element, thus controlling the sensor module 840 while the processor 810 is in a sleep state.

The input unit 950, for example, may include a touch panel 952, a (digital) pen sensor 954, a key 956, or an ultrasonic input unit 958. The touch panel 952, for example, may employ at least one of a capacitive type, a resistive type, an infrared type, or an ultrasonic wave type. Additionally, the touch panel 952 may even further include a control circuit. The touch panel 952 may further include a tactile layer to provide a tactile reaction for a user.

The (digital) pen sensor 954, for example, may be a part of a touch panel, or an additional sheet for recognition. The key 956, for example, may include a physical button, an optical key, or a keypad. The ultrasonic input unit 958 may allow the electronic device 901 to detect a sound wave by a microphone (e.g., a microphone 888) through an input unit which generates an ultrasonic signal, and then to find data.

The display 960 (e.g., the display 160) may include a panel 962, a hologram device 964, or a projector 966. The panel 962 may include the same or similar configuration with the display 160 of FIG. 1. The panel 962, for example, may be implemented to be flexible, transparent, or wearable. The panel 962 and the touch panel 952 may be implemented in one module. The hologram device 964 may display a three-dimensional image in a space by using interference of light. The projector 966 may project light to a screen to display an image. The screen, for example, may be placed in the inside or outside of the electronic device 901. According to an embodiment, the display 960 may further include a control circuit for controlling the panel 962, the hologram device 964, or the projector 966.

The interface 970, for example, may include a high-definition multimedia interface (HDMI) 972, a USB 974, an optical interface 976, or a D-sub (D-subminiature) 978. The interface 970, for example, may include the communication interface 170 shown in FIG. 1. Additionally or alternatively, the interface 970, for example, may include a mobile high-definition link (MHL) interface, an SD card/multi-media card (MMC) interface, or an Infrared data association (IrDA) standard interface.

The audio module 980, for example, may convert a sound and an electric signal in dual directions. At least one element of the audio module 980, for example, may be included in the input/output interface 150 shown in FIG. 1. The audio module 980, for example, may process sound information which is input or output through a speaker 982, a receiver 984, an earphone 986, or a microphone 988.

The camera module 991, for example, may be a unit capable of taking a still picture and a motion picture. According to an embodiment, the camera module 991 may include one or more image sensors (e.g., a front sensor or a rear sensor), a lens, an image signal processor (ISP), or a flash (e.g., an LED or a xenon lamp).

The power management module 995, for example, may manage power of the electronic device 901. According to an embodiment, the power management module 995 may include a power management integrated circuit (PMIC), a charger integrated circuit (IC), a battery gauge, or fuel gauge. The PMIC may operate in wired and/or wireless charging mode. A wireless charging mode, for example, may include a type of magnetic resonance, magnetic induction, or electromagnetic wave. For the wireless charging mode, an additional circuit, such as a coil loop circuit, a resonance circuit, or a rectifier, may be further included therein. The battery gauge, for example, may measure a remnant of the battery 996, a voltage, a current, or a temperature while the battery is being charged. The battery 996, for example, may include a rechargeable battery and/or a solar battery.

The indicator 997 may display specific states of the electronic device 901 or a part (e.g., the AP 910) thereof, for example, a booting state, a message state, or a charging state. The motor 998 may convert an electric signal into mechanical vibration and generate a vibration or haptic effect. Although not shown, the electronic device 901 may include a processing unit (e.g., a GPU) for supporting a mobile TV. The processing unit for supporting a mobile TV, for example, may process media data which are based on the standard of digital multimedia broadcasting (DMB), digital video broadcasting (DVB), or MediaFlo™.

Each of the above-described elements of the electronic device according to an embodiment of the present disclosure may be implemented in one or more components, and a name of a relevant component may vary according to a kind of electronic device. In various embodiments of the present disclosure, an electronic device may be formed by including at least one of the above components, may exclude a part of the components, or may further include an additional component. Otherwise, some of the components of an electronic device according to the present disclosure may be combined to form one entity, thereby making it also accomplishable to perform the functions of the corresponding components substantially in the same feature as done before the combination.

The term "module" as used herein for various embodiments of the present disclosure, for example, may mean a unit including one, or two or more combinations of hardware, software, and firmware. The term "module", for example, may be interchangeably used with a term such as unit, logic, logical block, component, or circuit. A "module" may be a minimum unit of a component integrated in a single body, or a part thereof. A "module" may be a minimum unit performing one or more functions or a part thereof. A "module" may be implemented mechanically or electronically. For example, a "module" according to various embodiments of the present disclosure may include at least one of an application-specific integrated circuit (ASIC) chip, a field-programmable gate array (FPGA), or a programmable logic device, those of which are designed to perform some operations and have been known or to be developed in the future.

At least a part of units (e.g., modules or functions thereof) or methods (e.g., operations) according to various embodiments of the present disclosure, for example, may be implemented in instructions which are stored in a computer-readable storage medium in the form of a programmable module. When such an instruction is executed by a processor (e.g., the processor 120), the processor may perform a function corresponding to the instruction. Such a computer-readable medium, for example, may be the memory 130.

The computer-readable recording medium may include a hard disk, a magnetic media (e.g., magnetic tape), optical media (e.g., CD-ROM, DVD, magneto-optical media (e.g., floptical disk)), or a hardware device (ROM, RAM, or flash memory). Additionally, a program instruction may include not only a mechanical code, such as a thing generated by a compiler, but also a high-level language code which is executable by a computer using an interpreter and so on. The above hardware unit may be formed to operate as one or more software modules for performing operations according to various embodiments of the present disclosure, and vice versa.

A module or a programming module according to various embodiments of the present disclosure may include at least one of the above elements, or a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added thereto.

According to various embodiments of the present disclosure, it may be allowable to regulate an application not to have greater permission privileges than what is necessary by using a permission setting token which can define permission information in need.

According to various embodiments of the present disclosure, it may be allowable to efficiently set an effective period for permission of an application through a permission setting token.

According to various embodiments of the present disclosure, it may be allowable to regulate permission, which is given to an application, or easily modify permission of an application through a permission setting token in need.

FIGS. 1-9 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   a memory; and
   at least one processor configured to:
      install an application by using an installation file associated with the application;
      detect whether the installation file includes a permission setting token;
      verify a validity of the permission setting token, wherein the verification is performed based on authentication information that is embedded in the permission setting token;
      grant at least one permission to the application based on verifying that the permission setting token is valid;
      store, in a database, an indication that the application is granted the permission;
      when the application is executed, search the database for the indication;
      if the indication of the permission is present in the database, execute one or more functions of the application permitted by the permission; and
      if the indication of the permission is absent from the database, execute one or more functions of the application permitted by a signature of the installation file,
      wherein the permission setting token is signed with a key uniquely identifying a manufacturer of the electronic device.

2. The electronic device of claim 1, wherein the at least one processor is further configured to terminate a permission setting process in response to detecting that the permission setting token is absent from the installation file.

3. The electronic device of claim 2, wherein the indication that the application is granted the permission is stored in the database in response to the permission setting token being valid.

4. The electronic device of claim 1, wherein the at least one processor is further configured to perform a search of the database in response to a function of the application being accessed and perform the function based on an outcome of the search.

5. The electronic device of claim 1, wherein the permission setting token comprises:
   identification information of a manufacturer or a developer;
   permission information defining the at least one permission;
   period information defining an effective period of the at least one permission; and
   authentication information for validating the permission setting token.

6. The electronic device of claim 5, wherein the at least one processor is further configured to grant the permission to the application for the effective period.

7. The electronic device of claim 1, wherein the at least one processor is further configured to update the database based on a control signal that is received from an external electronic device.

8. The electronic device of claim 1, wherein the at least one processor is further configured to execute the application based on the indication of the permission.

9. The electronic device of claim 8, wherein the indication of the permission is retrieved by searching the database.

10. A method comprising:
    installing, by an electronic device, an application by using an installation file associated with the application;
    detecting whether the installation file includes a permission setting token;
    verifying a validity of the permission setting token, wherein the verification is performed based on authentication information that is embedded in the permission setting token;
    granting at least one permission to the application based on verifying that the permission setting token is valid;
    storing, in a database, an indication that the application is granted the permission;
    when the application is executed, searching the database for the indication;
    if the indication is present in the database, executing one or more functions of the application permitted by the permission; and
    if the indication is absent from the database, executing one or more functions of the application permitted by a signature of the installation file,
    wherein the permission setting token is signed with a key uniquely identifying a manufacturer of the electronic device.

11. The method of claim 10, further comprising performing a search of the database in response to a function of the application being accessed, and performing the function based on an outcome of the search.

12. The method of claim 10, further comprising terminating a permission setting process in response to detecting that the permission setting token is absent from the installation file.

13. An electronic device comprising:
    a memory; and
    at least one processor configured to:

install an application by using an installation file associated with the application;
detect whether the installation file includes a permission setting token;
verify a validity of the permission setting token, wherein the verification is performed based on authentication information that is embedded in the permission setting token;
grant at least one permission to the application based on the permission setting token and a signature of the installation file when the permission setting token is verified;
store, in a database, an indication that the application is granted the permission;
when the application is executed, search the database for the indication;
if the indication of the permission is present in the database, execute one or more functions of the application permitted by the permission; and
if the indication of the permission is absent from the database, execute one or more functions of the application permitted by the signature of the installation file.

\* \* \* \* \*